United States Patent
Auvray

(10) Patent No.: US 10,909,253 B2
(45) Date of Patent: Feb. 2, 2021

(54) TECHNIQUE FOR CONTROLLING THE READING OF A DIGITAL OBJECT

(71) Applicant: Orange, Paris (FR)

(72) Inventor: Vincent Auvray, Équeurdreville (FR)

(73) Assignee: ORANGE, Paris (FR)

( * ) Notice: Subject to any disclaimer, the term of this patent is extended or adjusted under 35 U.S.C. 154(b) by 128 days.

(21) Appl. No.: 15/536,249

(22) PCT Filed: Dec. 4, 2015

(86) PCT No.: PCT/FR2015/053332
§ 371 (c)(1),
(2) Date: Jun. 15, 2017

(87) PCT Pub. No.: WO2016/097523
PCT Pub. Date: Jun. 23, 2016

(65) Prior Publication Data
US 2018/0025169 A1 Jan. 25, 2018

(30) Foreign Application Priority Data

Dec. 18, 2014 (FR) ..................................... 14 62770

(51) Int. Cl.
*G06F 21/62* (2013.01)
*H04W 12/08* (2009.01)
*H04L 29/06* (2006.01)
*H04W 12/04* (2009.01)

(52) U.S. Cl.
CPC .......... *G06F 21/6209* (2013.01); *G06F 21/62* (2013.01); *H04L 63/06* (2013.01); *H04L 63/107* (2013.01); *H04W 12/04* (2013.01); *H04W 12/0804* (2019.01); *G06F 2221/0708* (2013.01); *G06F 2221/2111* (2013.01)

(58) Field of Classification Search
CPC ..... G06F 21/6209; G06F 21/62; H04L 63/06; H04L 63/107
See application file for complete search history.

(56) References Cited

U.S. PATENT DOCUMENTS

| | | | |
|---|---|---|---|
| 9,491,237 B1* | 11/2016 | Garg | ...................... H04W 4/021 |
| 9,544,075 B2* | 1/2017 | Altman | .................. H04H 60/90 |
| 2005/0113123 A1* | 5/2005 | Torvinen | ............... H04L 12/189 |
| | | | 455/519 |
| 2007/0113081 A1* | 5/2007 | Camp | ..................... H04L 41/12 |
| | | | 713/168 |

(Continued)

OTHER PUBLICATIONS

English Translation of the International Written Opinion dated Jun. 8, 2017, for corresponding International Application No. PCT/FR2015/053332, filed Dec. 4, 2015.

(Continued)

*Primary Examiner* — Vance M Little
(74) *Attorney, Agent, or Firm* — David D. Brush; Westman, Champlin & Koehler, P.A.

(57) ABSTRACT

A technique for controlling the reading of a digital object by a user device. The digital object is stored locally in the memory of the user device. The reading of the digital object is conditioned by receiving at least one datum broadcast by a transmitting device using a radio communication channel. An area for reading the digital object is thus located in the radio range of the transmitter device. Reading is blocked outside of this reading area.

7 Claims, 2 Drawing Sheets

(56) References Cited

U.S. PATENT DOCUMENTS

| | | | | |
|---|---|---|---|---|
| 2007/0294645 | A1* | 12/2007 | Medvinsky | G06F 21/10 715/862 |
| 2010/0062743 | A1 | 3/2010 | Jonsson | |
| 2010/0144434 | A1* | 6/2010 | Leingang | A63F 13/12 463/35 |
| 2010/0146115 | A1* | 6/2010 | Bezos | H04W 4/21 709/225 |
| 2011/0314539 | A1* | 12/2011 | Horton | H04W 12/0802 726/20 |
| 2012/0064874 | A1* | 3/2012 | Pierce, Jr. | H04M 1/72522 455/418 |
| 2013/0294306 | A1* | 11/2013 | Borges | H04W 76/10 370/311 |
| 2014/0237076 | A1* | 8/2014 | Goldman | H04W 4/029 709/217 |
| 2014/0245393 | A1* | 8/2014 | Worrall | H04L 63/107 726/4 |
| 2014/0361872 | A1* | 12/2014 | Garcia | H04B 5/0062 340/5.74 |
| 2015/0089665 | A1* | 3/2015 | Nomura | G06F 21/62 726/27 |
| 2015/0348146 | A1* | 12/2015 | Shanmugam | G06Q 20/3829 705/71 |
| 2016/0055690 | A1* | 2/2016 | Raina | G07C 9/00007 340/5.61 |

OTHER PUBLICATIONS

International Search Report and Written Opinion dated Feb. 5, 2016 for corresponding International Application No. PCT/FR2015/053332, filed Dec. 4, 2016.

S. Gerasenko et al., "Beacon signals: what, why, how, and where?", published in IEEE Computer (vol. 34, Issue: 10, Oct. 2001).

* cited by examiner

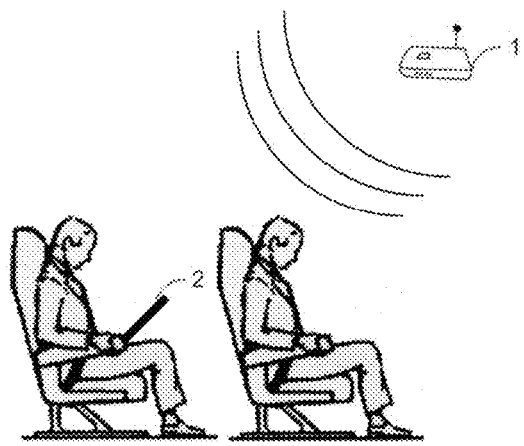
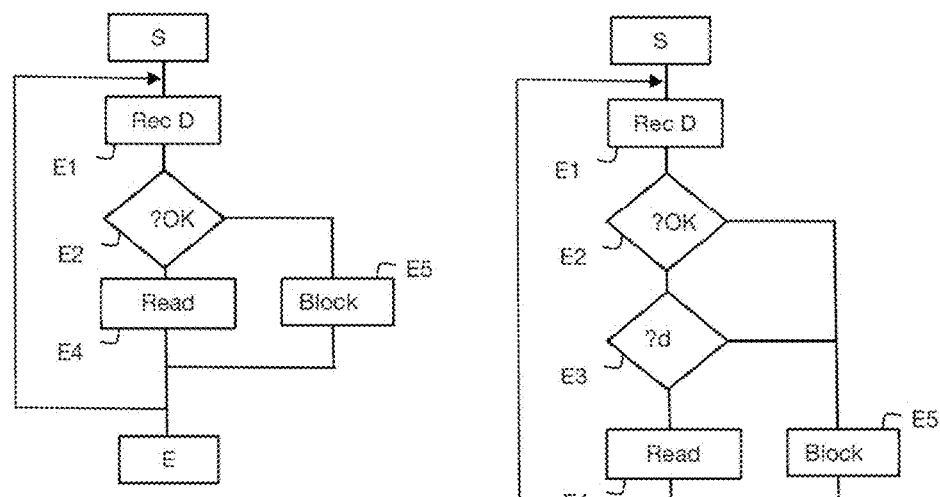

TECHNIQUE FOR CONTROLLING THE READING OF A DIGITAL OBJECT

CROSS-REFERENCE TO RELATED APPLICATIONS

This Application is a Section 371 National Stage Application of International Application No. PCT/FR2015/053332, filed Dec. 4, 2015, the content of which is incorporated herein by reference in its entirety, and published as WO 2016/097523 on Jun. 23, 2016, not in English.

FIELD OF THE DISCLOSURE

The invention relates to the general field of telecommunications.

The invention relates more particularly to controlling the reading of at least one digital object by a user provided with a user device.

BACKGROUND OF THE DISCLOSURE

A digital object should be understood to mean any digital object containing digital information such as, for example, multimedia digital information. As nonlimiting examples, the digital objects may be digital contents such as music, video, an e-book, a piece of software, an application, etc.

Digital object distribution systems are known in which a streaming (or continuous reading) is implemented at the level of a digital reading device. The digital object is broadcast continuously and is not in principle stored in the reading device. Access to a communication network is necessary to obtain this continuous reading.

Other digital object distribution systems allow a digital object download to the user device. The user then has the digital object available and can read it according to reading rights which have been assigned to him or her by the system. When being read, the digital object is available locally on the user device and no access to the communication network is necessary.

As an illustrative example, it is thus possible, in a transport means, such as an airplane, to offer digital objects by rental for the duration of the journey. The reading right is assigned uniquely by the supplier of the object for this particular case of use. To be sure that the reading is performed during the journey, the reading right is for example time-limited, to around the duration of the journey.

In other cases of use, such as waiting before a journey, it is difficult to define the time limit to be applied. Such is also the case for making a digital object available in a collective location for example newspapers in a restaurant.

There are also digital object distribution systems for which a geographic locating of the user device is provided. The geographic locating is performed by a trusted entity before the object is read. However, this solution requires an exchange of data with the trusted entity. It will thus be understood that this solution is difficult to implement in a moving transport means.

SUMMARY

According to a first aspect the subject of the invention is a method for controlling the reading of at least one digital object by a user device, said digital object being stored locally by said user device, said method comprising:

a reception of at least one datum broadcast by a transmitting device by means of a radio communication channel;

a reading of the digital object conditional on the reception of said datum, a reading area of said digital object being situated within the radio range of said transmitting device.

The datum indicates that a reading service is offered.

A reading area describes an area in which the reading of the digital object is authorized.

It is thus possible to control the reading of the digital object as a function of the presence or not of the user device in a radio coverage area of a transmitting device. This offers the benefit of requiring only the supervision of the reception of a radio signal transmitted by the transmitting device. As long as the user device is situated within the radio range of the transmitting device, the reading can be authorized. The control of the reading is thus implemented only locally at the user device level.

Furthermore, when the user device is situated in a moving transport means, its situation is assessed in relation to a transmitting device also situated in this transport means. No communication with terrestrial geographic locating means, such as GPS satellite location, or else a locating as a function of a cell identifier of a cellular network, is necessary. The locating of the user device is thus in relation to the transmitting device, which is itself in motion. Furthermore, the reading area can be defined more precisely than by using terrestrial locating means.

It is thus possible to offer a digital object service for which the operator provides the supplier of the digital objects with a guarantee of a reading that is controlled and limited to a reading area. This control technique is very simple to implement for an operator. The transmitting device can be incorporated in a digital object distribution station, or situated on a same site as the station or even be situated within a radio coverage area of the station.

In a particular embodiment, the transmitting device is of low-consumption radio technology. This makes it possible to limit the energy consumption of the user device for checking the reception of the datum by means of a radio communication channel. The digital object can thus be distributed via a radio communication channel allowing a high bit rate and not requiring only for the reading thereof a supervision of a low-consumption radio technology.

The different embodiments or features mentioned hereinbelow can be added, independently or in combination with one another, to the steps of the reading control method as defined previously.

According to a particular feature of the control method, the reading is also conditional on a reception of an identifier of a device having distributed said digital object.

This makes it possible to guarantee that the user device is always situated within an area in which the digital object has been distributed. As an illustrative example, magazines made available in a cafe must be read in this same cafe.

According to a particular feature of the control method, the digital object being protected by means of a secret key, a public key associated with the secret key is received from the transmitting device.

The public key that makes it possible to decrypt the digital object can be obtained only by being situated within the radio coverage area of the transmitting device. The digital object is thus secured and the supplier of digital objects is provided with an additional guarantee of the presence of the user device within the reading area.

According to a particular feature, the control method comprises an estimation of a distance between the user device and the transmitting device, and the reading is limited to a part of the digital object as a function of the estimated distance.

This makes it possible to adjust the size of the reading area by defining a distance threshold above which the reading is blocked or at least limited. The user can thus be urged to go to a place where the reading is authorized.

According to a second aspect, the invention relates also to a user device comprising a module for reading a digital object stored locally by said user device. This device comprises:
- a reception module for at least one datum broadcast by a transmitting device by means of a radio communication channel, said datum indicating that a reading service is offered;
- a module for controlling the reading of the digital object, arranged to control the reading module as a function of the reception of said datum, a reading area of said digital object being situated within the radio range of said transmitting device.

This user device can of course comprise the different features relating to the reading control method as described previously, which can be combined or taken in isolation. Thus, the advantages stated for the reading control method according to the first aspect can be transposed directly to the user device. Consequently, they are not detailed more fully.

According to a third aspect, the invention relates also to a reading control system, comprising at least one transmitting device, arranged to transmit at least one datum by means of a radio communication channel and at least one user device according to the second aspect.

This system can of course comprise the different features relating to the reading control method as described previously, which can be combined or taken in isolation. Thus, the advantages stated for the reading control method according to the first aspect can be transposed directly to the system. Consequently, they are not detailed more fully.

According to a fourth aspect, the invention relates to a program for a user device, comprising program code instructions intended to control the execution of those of the steps of the reading control method previously described implemented by the user device, when this program is run by this device and a storage medium can be read by a device on which a program for a device is stored.

The advantages stated for the reading control method according to the first aspect can be transposed directly to the program for a user device and to the storage medium.

BRIEF DESCRIPTION OF THE DRAWINGS

The technique for controlling the reading of a digital object will be better understood from the following description of particular embodiments, with reference to the attached drawings in which:

FIG. 1 represents a user device located in a reading area in a particular embodiment;

FIGS. 2a and 2b illustrate steps of a reading control method implemented by a user device according to particular embodiments;

DETAILED DESCRIPTION OF ILLUSTRATIVE EMBODIMENTS

Figure 3:
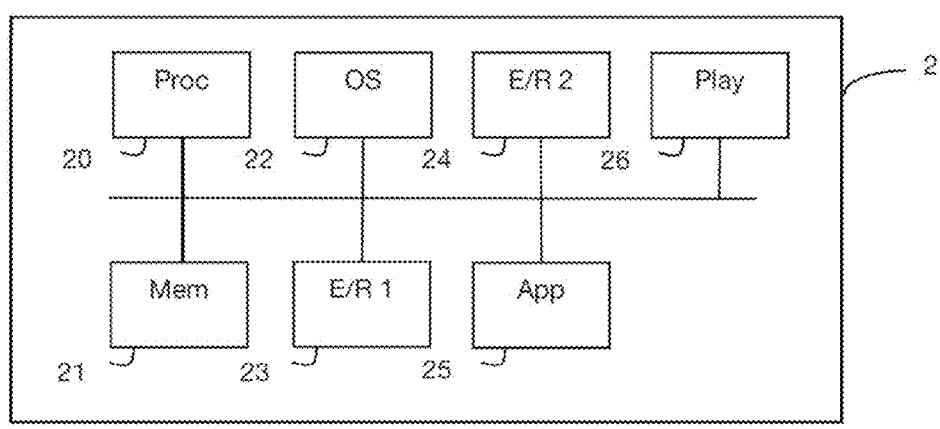
FIG. 3 represents a user device according to a particular embodiment.

FIG. 1 represents an environment in which a reading area for a digital object made available to a user device 2 is defined.

FIG. 1 shows two users seated in an airplane. One of the two users uses the user device 2. This user device 2 is for example a digital tablet, a smartphone, a portable computer, or the like. There is no limitation as to the number of user devices present in the reading area, nor on the type of these user devices. Obviously, it will be understood here that the user device comprises a digital reading module which is capable of reading the content of a digital object.

A digital object should be understood to be any digital object containing digital information such as, for example, multimedia digital information. As nonlimiting examples, the digital objects can be digital contents such as music, video, an e-book, a piece of software, an application, etc.

This environment comprises a wireless access point 1. Such an access point for example allows wireless user devices to access a wide-area communication network, such as the internet network.

In a particular embodiment, this access point 1 acts as digital object distribution station. The digital object distribution station allows access to a digital bookshop, offering digital objects made available for download by a user device. The digital bookshop can be local to the distribution station or remote. These digital objects can be loaned or rented.

The access point 1 makes it possible to download, locally and at high bit rate, a digital object for subsequent reading. When the user wants to obtain a digital object, the latter is downloaded via a communication network, of generally high bit rate. It is for example a radio communication network, for example conforming to the IEEE 802.11 g standard. It is stressed here that there is no limitation as to the way in which the digital objects are distributed. It can also be a wired (USB, Firewire, etc.) or optical (infrared, Li-Fi, etc.) communication network. Hereinbelow, embodiments for which the distribution is performed by means of a radio communication channel are adopted by way of illustration.

Such a digital object distribution offering can notably be offered in transport means (train, airplane), in waiting areas (boarding zone, waiting room, etc.), leisure areas (café, restaurant, etc.). It is stressed here that this distribution offering does not require, for the user device 2, direct access to a wide-area communication network, such as the internet network. The digital objects are available directly from the distribution station by means of a radio or other communication channel.

The operator of this distribution station wants to control the reading of the downloaded digital object and limit it to a reading area. This limitation can for example be defined in an agreement between the supplier of the digital object and the distributor of this object. Thus, for a distribution station installed in an airplane, the rights have been negotiated for reading performed only in the airplane. It can also be a local service offering, allowing an owner of the premises to stand out from his or her competitors. Thus, it is common practice to freely read periodicals (newspapers, magazines) made available in a café or a restaurant. This common practice can then be offered in the form of digital objects corresponding to the periodicals.

The reading area thus defines an area in which the reading of the digital object is authorized. Outside of this reading area, the reading of the digital object is blocked. To block the reading of the digital object, various alternatives can be envisaged, up to the deletion of a digital object from the user device. The deletion of the digital object in effect makes it possible to guarantee that the digital object will not be able to be read subsequently after deletion of any protection mechanisms.

In a first embodiment, the user is notified of the availability of such a digital distribution offering via a second radio communication network, of low-consumption type according to an access technology, suitable for wireless personal networks, such as Bluetooth®, Z-Wave®. This type of radio network makes it possible to ensure a radio coverage in an area called WPAN (Wireless Personal Area Network).

The Bluetooth® technology is based on the IEEE 802.15.1 specification "Wireless Medium Access Control (MAC) and Physical Layer (PHY) Specifications for Wireless Personal Area Networks (WPANs)" and operates in the 2.4 GHz frequency band. There is also a low-consumption version of this technology, known as BLE, "Bluetooth Low Energy". This BLE technology is defined by a Bluetooth standardization group SIG in the form of a set of documents called "Bluetooth Core Specification 4.1".

The Z-Wave® technology is based on products certified by the Z-Wave alliance and operates in the 868.42 MHz frequency band.

A transmitting device transmits, more specifically broadcasts, a beacon signal in accordance with the technology of the second communication network. This beacon signal is also called "Beacon", and indicates that a digital object reading service is offered. An identifier of this reading service is broadcast by means of the beacon signal.

In a particular embodiment, the beacon indicates also that the digital object distribution service is offered. An identifier, identical or not to that of the reading service, is broadcast by means of the beacon signal. At the request of the user, the digital object is distributed via the first communication network, at the generally higher bit rate than that of the second radio communication network.

The transmitting device can be incorporated in the access point 1 and the access point thus acts as transmitting device. The transmitting device can also be collocated with the access point in one and the same physical transmission site, or even be located in a coverage area of the access point 1.

In this first embodiment, the reading area is defined by all or part of the radio coverage of the transmitting device belonging to the second radio communication network. A user device is situated in a radio coverage area when it receives a signal transmitted by a transmitting device. This first embodiment offers the advantage of limiting the energy consumption of the user device to seek the presence or not of a transmitting device, and to thus obtain the information that it is situated in the reading area.

It is stressed here that several transmitting devices can be associated with an access point acting as digital object distribution station. One of the transmitting devices is for example collocated with the access point. Other transmitting devices are distributed to define the reading area. For example, for a reading area corresponding to a radio coverage area of the access point 1 acting as distribution station, several transmitting devices are associated with the access point 1 to allow a radio coverage that is virtually equivalent to that of the radio coverage area of this access point.

It is also possible to deploy transmitting devices so as to ensure a radio coverage over a ring zone centered on the access point. This makes it possible to detect the entry of the user device into the reading area following a detection of a beacon signal. The number of transmitting devices to be provided is lower than that to be provided for a complete coverage of the radio coverage area. The deployment of the network of transmitting devices is thus less costly.

In a second embodiment, the user is notified of the availability of such a digital object distribution offering via the radio communication network, which allows the distribution of the digital objects. In this second embodiment, the reading area is defined by all or part of the radio coverage of the access point 1 for the technology of the radio communication network, via which the digital object is distributed.

FIG. 3 represents a user device 2 in a particular embodiment. The user device 2 notably comprises:
  a memory area 21, arranged to store an application which comprises code instructions for implementing the steps of the reading control method;
  a storage memory, not represented, arranged to store data used in the implementation of the reading method;
  a processor 20 for executing code instructions of software modules;
  an operating system module 22, for example android or iOS;
  an interface module 23 with a first communication network, arranged to transmit and receive data, for example digital objects;
  a reading control module 25;
  a digital object reading module 26.

In one embodiment, the distribution of the digital objects is performed by means of a radio communication channel. In this embodiment, the interface module 23 for example conforms to the IEEE 802.11 g or Wi-Fi radio technology.

For an implementation in an environment described previously (one or more transmitting devices associated with an access point), the user device 2 further comprises a second interface module 24, arranged to receive data by means of a radio communication channel of a second wireless communication network. The second radio interface module 24 for example conforms to the low-consumption radio technology, for example BLE.

It is stressed here that the user device 2 also comprises other processing modules, not represented in FIG. 3, arranged to implement the various functions of the user device.

There now follows a description of the reading control technique in a particular embodiment, as implemented by a user device 2, in relation to FIG. 2a.

Hereinbelow, an embodiment in which the access point 1 acting as digital object distribution station also comprises the low-consumption radio transmitting device, for example BLE, is assumed. Consequently, the user device 2 considered comprises a first radio interface module 23, for example IEEE 802.11 g, and a second radio interface module 24, for example BLE.

It is assumed that a digital object has been downloaded beforehand from a distribution station and is stored locally by the user device 2.

The user interacts with the user device 2 in order to start reading the digital object. The reading module 26 then transmits a request to the control module 25, in order to check whether the reading is authorized. The control module 25 then triggers the execution of the following steps.

In a step E1, the user device 2 searches for a beacon signal transmitted, more specifically broadcast, by a transmitting device in accordance with the second radio technology and receives a datum by means of a radio communication channel. More specifically, the second radio interface module 24 detects the beacon signal and transmits a beacon signal detection information item to the control module 25. The detection information item corresponds to a datum received via the beacon signal and indicating that a reading service associated with the distribution service is offered. An identifier of this reading service is broadcast by means of the beacon signal. It can be identical to the identifier of the distribution service.

In a step E2, the user device 2 checks that a datum has been received for the reading service.

If such is the case, in a step E4, the user device 2 begins or continues to read the digital object depending on the case. More specifically, the control module 25 commands the reading module 26 to start or resume the reading of the digital object.

Otherwise, in a step E5, the user device 2 blocks the reading of the digital object. The absence of reception of a datum for the reading service is a consequence, for example, of a movement of the user device outside of the radio coverage area of the transmitting device. More specifically, the control module 25 commands the reading module 26 to stop or suspend the reading of the digital object.

In all cases, the user device 2 executes the datum reception step E1 again.

Thus, in this embodiment, the reading of the digital object is conditional on the reception of a datum for the reading service by means of a radio communication channel. The datum for the reading service indicates that a reading service is offered. As long as the user device 2 is situated within the radio range of the transmitting device for the BLE technology, the reading is authorized. The reading area is defined by the radio range of the transmitting device for the BLE technology. This embodiment offers the benefit of requiring, for the user device, only the supervision of the reception of the BLE beacon signal. It is thus very simple to implement. When this transmitting device associated with the access point is installed in a moving transport means, this embodiment makes it possible to dispense with any communication with terrestrial location means, such as GPS satellite location, or else location as a function of a cell identifier of a cellular network. Such location means provide an absolute location, which cannot be used for an implementation in a moving environment. The location of the user device is thus in relation to the transmitting device associated with the access point, which is itself in motion.

Furthermore, depending on the location of the transmitting device or devices, the reading area can be defined more precisely than by using terrestrial location means.

In a first variant, the digital object has been distributed in association with an identifier of an access point, within the radio coverage of which the user device 2 must be located to read the digital object. The transmitting device or the transmitting devices are associated with this access point and the beacon signal broadcasts an access point identifier. In this variant, in the step E1, the user device 2 also receives an access point identifier by means of the BLE communication channel. This identifier is transmitted from the interface module 24 to the control module 25.

An access point identifier corresponds for example to the SSID (Service Set Identifier) information item. This SSID information item is an alphanumeric key with a maximum length of 32 characters uniquely identifying an access point. As an illustrative example, the broadcast information item comprises a prefix corresponding to an identifier of the operator offering the service and a suffix corresponding to the identifier of the associated access point. The user device 2 thus simply obtains the identifier of the access point from the broadcast information item. Still by way of illustrative example, the broadcast information item corresponds to the identifier of the associated access point.

In the step E2, the user device 2, more specifically the control module 25, also checks whether the access point identifier received corresponds to the access point identifier associated with the distributed digital object. If such is the case, the reading of the digital object is authorized (step E4). Otherwise, the reading of the digital object is blocked (step E5). This first variant makes it possible to block the reading when the user device is no longer located in the coverage area of the digital content distribution station. Thus, the reading of the digital object is conditional on the presence of the user device within the digital object distribution area. As an example, a magazine distributed in a café cannot be read in another café also implementing the control technique. Still by way of example, a digital object distributed from an access point situated in an airplane of an airline cannot be read subsequently in an airplane of another airline.

FIG. 2b represents steps of the reading control method for a second variant, alternative to or cumulative with the first variant. In this second variant, the distance of the user device 2 from the transmitting device is assessed on the basis of a datum representative of an RSSI (Received Signal Strength Indication) radio signal. In the step E1, a datum representative of the radio signal is also determined. More specifically, the radio interface module 24 determines and sends this datum representative of the radio signal to the control module 25 in the step E1. When, in the step E2, the user device 2 has checked that a datum has indeed been received by means of the radio communication channel, in a step E3, the user device 2 determines, from the RSSI datum, a distance between itself and the transmitting device associated with the access point 1 and checks whether this distance is less than a threshold value. When the distance is less than the threshold value, the reading of the digital object is authorized (step E4). Otherwise, the reading of the digital object is blocked (step E5). It is thus possible to limit the reading area to a part of the radio coverage area of the transmitting device associated with the access point 1. This reading area roughly corresponds to a disk centered on the location of the transmitting device and with a radius that is the threshold value. The threshold value is for example set at ten meters. This makes it possible to more precisely define the reading area to limit it to a service location. As an illustrative example, a digital object distributed from an access point situated in an airplane of an airline cannot be read in an airplane of another airline parked nearby.

Optionally, it is also possible when, in the step E3, the distance is greater than the threshold value, to limit the reading to only a part of the digital object, such as, for example, a trailer for a film, a title page for a newspaper, etc. Thus, the reading is not abruptly cut off and a message can prompt the user to move to the reading area to resume the reading of the digital object. Thus, for the example described previously with a ten-meter threshold value, in the reading area corresponding to the disk of ten-meter radius, the reading is authorized. In a ring delimited by two concentric circles with respective radii of ten and thirty meters, the reading is limited. Beyond, the reading is blocked and the digital object can be deleted from the user device 2.

In a third variant, alternative to or cumulative with the first and second variants, the digital object distributed is protected by a private secret key-based encryption. For this third variant, a public key associated with the private key is broadcast via the beacon signal. In the absence of reception of this public key, the reading of the digital object is impossible. This makes it possible to reinforce the reading control in the reading area. More specifically, the radio access module 24 transmits this public key to the control module 25 in the step E1. When the reading is authorized in the step E2, the control module 25 transmits the public key to the reading module 26.

In a fourth variant, alternative to or cumulative with the preceding variants, when transmitting devices are deployed so as to ensure a radio coverage over a ring area centered on the digital object distribution station, the entry of the user device into the reading area is detected by a reception of a beacon signal. This detection can then give a reading right to the user device, the user being passed by a required transition point.

This embodiment and the different variants have been described for an access point acting as digital object distribution station and also comprising a transmitting device making it possible to implement the reading service.

This description can easily be transposed to a transmitting device, comprising a radio access module of low-consumption type, associated with an access point acting as digital object distribution station.

This description can also be transposed to an access point acting as digital object distribution station and comprising a single radio access module, for example Wi-Fi. The radio access module contributing to the implementation of the different steps at the user device level is then the radio access module 23. The second variant of the reading control method notably makes it possible to reduce the coverage area of such a radio access module.

No limitation is attached to these different embodiments and a person skilled in the art can define others thereof according to the needs of the reading service for the implementation of the reading area.

The reading control technique is implemented by means of software and/or hardware components. In this respect, the term "module" can in this document correspond equally to a software component, to a hardware component or to a set of hardware and/or software components, capable of implementing a function or a set of functions, according to what is described previously for the module concerned.

A software component corresponds to one or more computer programs, one or more sub-programs of a program, or more generally to any element of a program or of a piece of software. Such a software component is stored in memory then loaded and run by a data processor of a physical entity and can access the hardware resources of this physical entity (memories, storage media, communication bus, electronic input/output boards, user interfaces, etc.).

Similarly, a hardware component corresponds to any element of a hardware assembly. It can be a programmable or non-programmable hardware component, with or without a processor incorporated for the execution of software. It can for example be an integrated circuit, a chip card, an electronic board for the execution of firmware, etc.

In a particular embodiment, the modules 22, 23, 24, 25, 26 are arranged to implement the reading control method described previously. They are preferably software modules comprising software instructions for executing those of the steps of the reading control method described previously implemented by a user device. The invention therefore also relates to:

a program for a user device, comprising program code instructions intended to control the execution of the steps of the reading control method described previously, when said program is run by this user device;

a storage medium that can be read by a user device on which the program for a device is stored.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention also relates to a reading control system associated with a reading service, comprising at least one transmitting device and at least one user device 2 as described previously.

An exemplary embodiment of the invention remedies inadequacies/drawbacks of the prior art and/or provides improvements thereto.

Although the present disclosure has been described with reference to one or more examples, workers skilled in the art will recognize that changes may be made in form and detail without departing from the scope of the disclosure and/or the appended claims.

The invention claimed is:

1. A method for controlling reading of at least one digital object by a user device, said digital object being associated with an identifier and distributed by a distribution device and stored locally by said user device, said method comprising the following acts performed by the user device:

the user device checking whether the user device receives at least one beacon signal broadcast by a transmitting device by using a radio communication channel, wherein the transmitting device is associated with the distribution device and the at least one beacon signal comprises an identifier of the distribution device and indicates that a digital object reading service is offered;

reading the digital object in response to the user device being within radio broadcast range of the transmitting device, the user device receiving the at least one beacon signal, and the identifier received with the at least one beacon signal corresponding to the identifier associated with the digital object;

blocking said reading in response to the user device not receiving the at least one beacon signal or the identifier received with the at least one beacon signal not corresponding to the identifier associated with the digital object; and repeating the acts of checking and reading at least once.

2. The method as claimed in claim 1, wherein the digital object is protected by a secret key, and the method further comprises receiving a public key associated with the secret key from the transmitting device.

3. The method as claimed in claim 1, comprising estimating a distance between the user device and the transmitting device, and in which the reading is limited to a part of the digital object as a function of the estimated distance.

4. The method as claimed in claim 1, wherein, after the act of reading the digital object:

the repeating of the act of checking comprises the user device checking whether at least one new beacon signal has been received from the transmitting device; and the user device determining that no new beacon signal has been received and in response performing the act of blocking said reading.

5. A user device comprising:

an interface configured to receive at least one beacon signal broadcast by a transmitting device by using a radio communication channel, wherein the transmitting device is associated with a distribution device that distributes a digital object and the at least one beacon signal comprises an identifier of the distribution device and indicates that a digital object reading service is offered, said digital object being stored locally by said user device;

at least one non-transitory computer-readable medium comprising instructions stored thereon; and a processor configured by the instructions to perform acts comprising:

the user device checking whether the user device receives the at least one beacon signal broadcast by the transmitting device;

reading the digital object in response to the user device being within radio broadcast range of the transmitting device, the user device receiving the at least one beacon signal, and the identifier received with the at least one beacon signal corresponding to an identifier associated with the digital object;

blocking said reading in response to the user device not receiving the at least one beacon signal or the identifier received with the at least one beacon signal not corresponding to the identifier associated with the digital object; and repeating the acts of checking and reading at least once.

6. A reading control system comprising:

at least one transmitting device, arranged to broadcast at least one beacon signal transmitted on a radio communication channel, the at least one beacon signal indicating that a digital object reading service is offered and comprising an identifier of a distribution device that is associated with the transmitting device and that distributes a digital object; and at least one user device on which the digital object is stored locally, said at least one user device comprising:

an interface configured to receive the at least one beacon signal broadcast by the at least one transmitting device;

at least one non-transitory computer-readable medium comprising instructions stored thereon; and a processor configured by the instructions to perform acts comprising:

the user device checking whether the user device receives the at least one beacon signal broadcast by the at least one transmitting device;

reading the digital object in response to the user device being within radio broadcast range of the at least one transmitting device, the user device receiving the at least one beacon signal, and the identifier received with the at least one beacon signal corresponding to an identifier associated with the digital object;

blocking said reading in response to the user device not receiving the at least one beacon signal or the identifier received with the at least one beacon signal not corresponding to the identifier associated with the digital object; and repeating the acts of checking and reading at least once.

7. A non-transitory computer-readable medium, comprising program code instructions stored thereon to control execution of a method for controlling reading of at least one digital object by a user device, when said program is run by said user device, wherein said digital object is associated with an identifier, is distributed by a distribution device and is stored locally by said user device, and said method comprises the following acts performed by the user device:

the user device checking whether the user device receives at least one beacon signal broadcast by a transmitting device by using a radio communication channel, wherein the transmitting device is associated with the distribution device and the at least one beacon signal comprises an identifier of the distribution device and indicates that a digital reading service is offered;

reading the digital object in response to the user device being within radio broadcast range of the transmitting device, the user device receiving the at least one beacon signal, and the identifier received with the at least one beacon signal corresponding to the identifier associated with the digital object;

blocking said reading in response to the user device not receiving the at least one beacon signal or the identifier received with the at least one beacon signal not corresponding to the identifier associated with the digital object; and repeating the acts of checking and reading at least once.

* * * * *